Oct. 30, 1951        F. DE MIER, SR        2,573,186
ADJUSTABLE HEADREST ATTACHMENT FOR BACK RESTS
Filed March 19, 1948                                                  2 SHEETS—SHEET 2
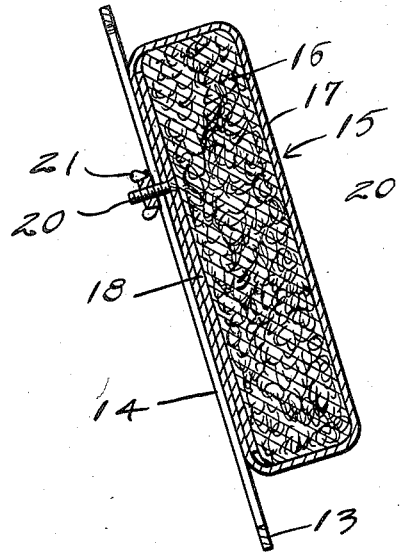
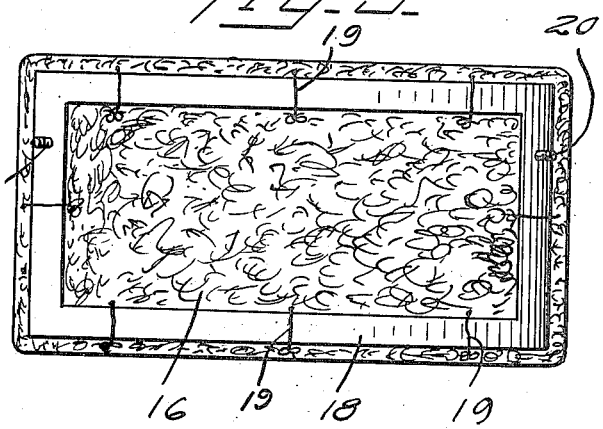
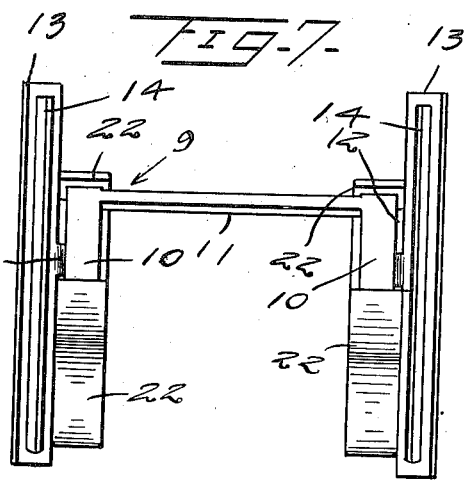
Inventor
Fred DeMier, Sr.
By John N. Randolph
Atty.

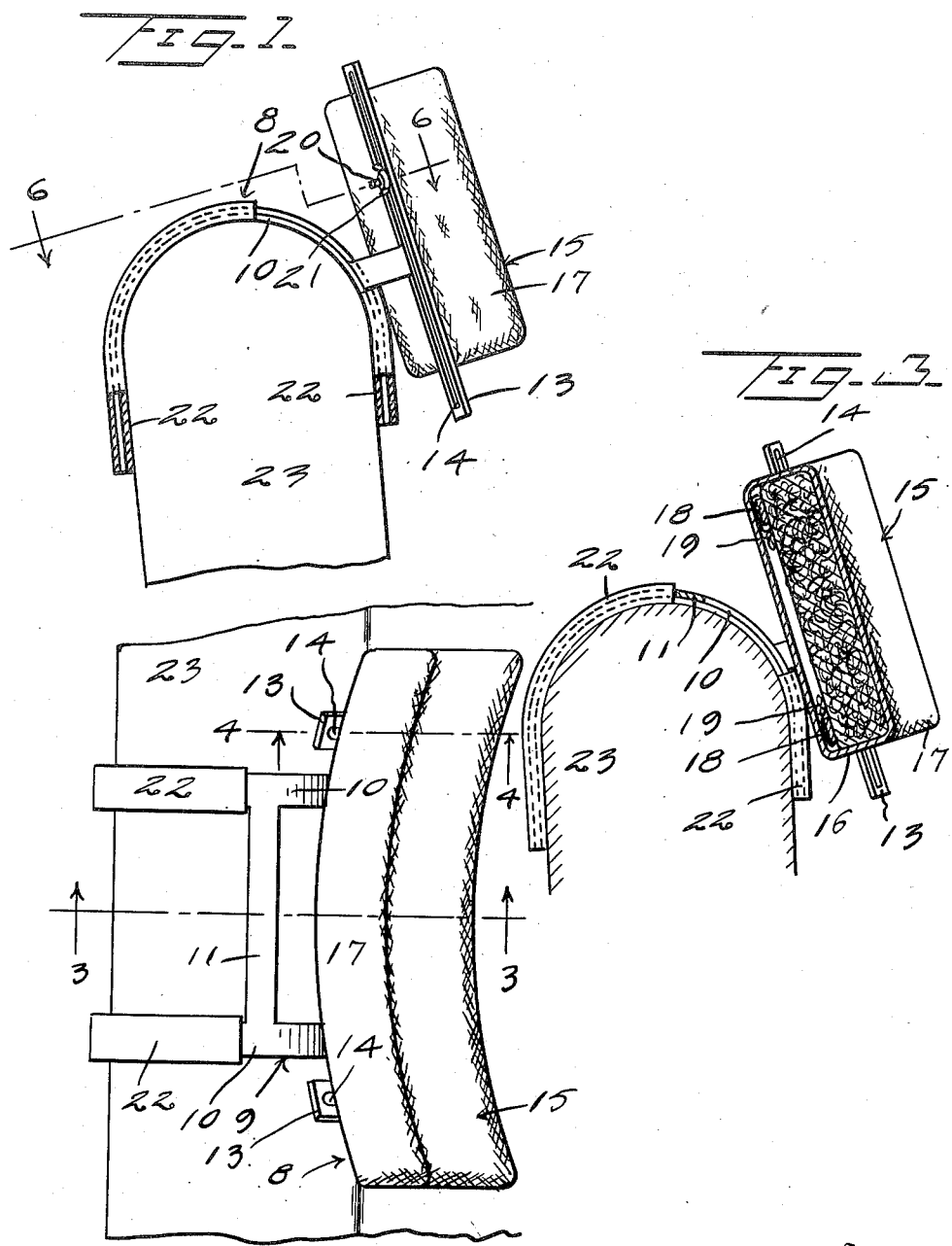

Patented Oct. 30, 1951

2,573,186

UNITED STATES PATENT OFFICE 2,573,186

ADJUSTABLE HEADREST ATTACHMENT FOR BACK RESTS

Fred De Mier, Sr., Miami, Okla.

Application March 19, 1948, Serial No. 15,825

3 Claims. (Cl. 155—174)

This invention relates to a demountable and adjustable headrest for back rests of seats generally and which is particularly applicable to seats of passenger cars.

The primary object of the present invention is to provide a headrest capable of being quickly applied to or removed from the upper edge of a back rest of a seat and provided with an adjustably supported pad or cushion affording a rest for the head and which may be adjusted upwardly or downwardly for properly positioning the cushion to support the head and neck, depending upon the height of the back rest.

A further object of the invention is to provide a headrest of extremely simple construction and capable of being economically manufactured and sold and which will be very durable and efficient for its intended purpose.

Another object of the invention is to provide a headrest which can be quickly and easily applied to or removed from the back rest of a seat or other item of furniture and which will not damage the back rest.

Various other objects and advantages of the invention will hereinafter become more fully apparent from the following description of the drawings, illustrating a presently preferred embodiment thereof, and wherein:

Figure 1 is a side elevational view partly in section showing the headrest in an applied position;

Figure 2 is a top plan view thereof;

Figures 3 and 4 are cross sectional views taken substantially along planes as indicated by the lines 3—3 and 4—4, respectively, of Figure 2;

Figure 5 is a rear elevational view of the headrest pad or cushion with the covering thereof removed and showing the supporting frame in an applied position;

Figure 6 is a top plan view partly in section taken substantially along a plane as indicated by the line 6—6 of Figure 1, and Figure 7 is a front elevational view of the headrest supporting structure.

Referring more specifically to the drawings, the novel headrest in its entirety and constituting the invention is designated generally 8 and includes a supporting structure, designated generally 9 having two corresponding arch-shaped members 10 which are joined intermediate of their ends by a bar 11 which is preferably formed integral therewith. The arch members 10, adjacent corresponding ends thereof, are each provided with an outwardly projecting supporting arm 12 which is preferably formed integral therewith. Each of the supporting arms 12 supports an elongated bar 13. The bars 13 are suitably secured to or formed integral with the arms 12 intermediate of the ends of said bars and adjacent their corresponding, inner edges so that the bars 13 are offset outwardly with respect to the arch members 10 and are disposed at an angle to said arch members and canted with respect to one another, as best illustrated in Figure 6. Each of the bars 13 is provided with a slot 14 which extends substantially the length thereof, for a purpose which will hereinafter become apparent.

A headrest, designated generally 15 includes a pad or cushion 16 which is preferably formed of sponge rubber but which may be formed of various other suitable materials and which is enclosed in a covering or casing 17 which may be formed of any suitable fabric. An elongated rectangular frame 18 is secured to the rear side of the pad or cushion 16, beneath the covering 17 by suitable ties 19 and each of the end portions thereof is provided with an outwardly projecting threaded stud or bolt 20 which extends outwardly through an opening of the covering 17. The frame 18 is bowed longitudinally so that the cushion 16 and covering 17 will be similarly bowed longitudinally so that the outer side of the headrest 15 will be concave to adapt it to fit comfortably against the head and neck. The threaded studs or bolts 20 are spaced apart a distance equal to the space between the slots 14 of bars 13 so that one of said studs 20 can extend through and slidably engage each of said slots 14. Each of the studs 20 carries a wing nut 21 which is adapted to be tightened for adjustably clamping the headrest 15 to supporting structure 9 and so that by loosening the nuts 21 the headrest 15 may be adjusted upwardly or downwardly with respect to the supporting structure 9.

The end portions of the arch members 10 are preferably enclosed in tubular casings 22 of rubber or other suitable material which extend inwardly from the ends thereof to the bar 11 and arms 12 and which are adapted to protect the back rest 23 on which the supporting structure 9 is mounted. The arch members 10 of the supporting structure 9 are demountably engaged over the upper edge of the back rest 23 as clearly illustrated in Figures 1 to 3 and so that the arms 12 will project from the forward side of the back rest 23 and so that the headrest 15 will be supported in front of or forwardly of and above the back rest 23 and at a convenient level to support the head and neck, as best illustrated in Figures 1 and 3.

Various modifications and changes are contemplated and may obviously be resorted to, without departing from the spirit or scope of the invention as hereinafter defined by the appended claims.

I claim as my invention:

1. A demountable headrest attachment for back rests comprising a supporting structure adapted to engage over the upper edge of a back rest and having arms projecting forwardly therefrom with respect to the back rest, slotted bars rigidly secured to said arms and disposed forwardly of the back rest, and a headrest having a rear surface spaced portions of which bear against said bars, fastening means connected to the headrest and slidably engaging the slots of said bars, said fastening means being tightened to clamp the headrest to the slotted bars for adjustably supporting the headrest relatively to the supporting structure and in front of and adjustable with respect to the back rest.

2. A headrest attachment as in claim 1, said headrest including an elongated cushion and an elongated, open rigid frame having sides and ends secured to the rear side of said cushion adjacent its edges, said frame being bowed longitudinally for supporting the cushion in a longitudinally bowed position and with the forward, opposite side thereof concave, and said fastening means being mounted on the ends of said elongated rigid frame.

3. A headrest attachment as in claim 1, said headrest including an elongated cushion, an elongated, rigid frame secured to the rear side of said cushion, said frame being bowed longitudinally for supporting the cushion in a longitudinally bowed position and with the forward, opposite side thereof concave, and said fastening means being mounted on the ends of said elongated rigid frame, said slotted bars being disposed at an angle to the plane of the back rest for supporting the headrest in front of and at an angle to said back rest.

FRED DE MIER, SR.

REFERENCES CITED

The following references are of record in the file of this patent:

UNITED STATES PATENTS

| Number | Name | Date |
| --- | --- | --- |
| 296,779 | Plummer | Apr. 15, 1884 |
| 380,251 | Dillon | Mar. 27, 1888 |
| 497,697 | Wesson | May 16, 1893 |
| 506,983 | Diemmer | Oct. 17, 1893 |
| 856,025 | Brown | June 4, 1907 |